United States Patent
Hiller et al.

(10) Patent No.: US 11,937,611 B2
(45) Date of Patent: Mar. 26, 2024

(54) DEVICE FOR HANGING CAPTURED GAME (71) Applicant: Hangry Brand Enterprises, L.L.C., Brighton, MI (US)

(72) Inventors: Jennifer Leigh Hiller, Brighton, MI (US); Michael James Hiller, Brighton, MI (US)

(73) Assignee: Hangry Brand Enterprises, L.L.C., Brighton, MI (US)

( * ) Notice: Subject to any disclaimer, the term of this patent is extended or adjusted under 35 U.S.C. 154(b) by 211 days.

(21) Appl. No.: 17/506,811

(22) Filed: Oct. 21, 2021

(65) Prior Publication Data

US 2022/0125061 A1 Apr. 28, 2022

Related U.S. Application Data (60) Provisional application No. 63/198,501, filed on Oct. 23, 2020.

(51) Int. Cl.
*A22C 15/00* (2006.01)
*A01M 31/00* (2006.01)
*A22C 25/08* (2006.01)

(52) U.S. Cl.
CPC .......... *A22C 15/003* (2013.01); *A01M 31/00* (2013.01); *A22C 25/08* (2013.01)

(58) Field of Classification Search
CPC ....... A22C 15/003; A22C 25/08; A01M 31/00
USPC .................................................. 452/187–192
See application file for complete search history.

(56) References Cited

U.S. PATENT DOCUMENTS

| | | |
|---|---|---|
| 3,137,030 A | 6/1964 | Varner |
| D257,665 S | 12/1980 | Young |
| D274,036 S | 5/1984 | Schraml |
| D312,388 S | 11/1990 | Riener |
| D502,756 S | 3/2005 | Birdwell et al. |
| 7,444,779 B2 | 11/2008 | Hei |
| 8,062,107 B1 | 11/2011 | Sauer |
| 2006/0234618 A1 | 10/2006 | Koch et al. |
| 2012/0319065 A1* | 12/2012 | Scott ................ A22B 5/00 254/362 |

(Continued)

FOREIGN PATENT DOCUMENTS

| | | |
|---|---|---|
| CA | 2714157 A1 | 2/2011 |
| CA | 2778618 A1 | 12/2012 |
| CA | 2980633 A1 | 3/2018 |

OTHER PUBLICATIONS

Canadian Office Action for Canadian application No. 3,135,649, dated Jan. 27, 2023.

*Primary Examiner* — Richard T Price, Jr.
(74) *Attorney, Agent, or Firm* — Howard & Howard Attorneys PLLC (57) ABSTRACT

A device for hanging captured game is provided. The device includes a polymerized device body. The device body includes a front planar surface and a rear planar surface, wherein the rear planar surface is parallel to the front planar surface. The device body further includes a rimless boundary around a perimeter of the polymerized device body and a game hook formed unitarily with the polymerized device body such that a first surface of the game hook is coincident to the front planar surface and a second surface of the game hook is coincident to the rear planar surface. The front planar surface directly transitions to the rimless boundary. The rear planar surface directly transitions to the rimless boundary.

18 Claims, 13 Drawing Sheets

(56) References Cited

U.S. PATENT DOCUMENTS

2013/0126689 A1 5/2013 Richards
2016/0029649 A1* 2/2016 Soncini ................ A22C 15/005
                                                              452/193

* cited by examiner

DEVICE FOR HANGING CAPTURED GAME

CROSS-REFERENCE TO RELATED APPLICATIONS

This disclosure claims priority to Provisional Patent Application No. 63/198,501 filed on Oct. 23, 2020, which is hereby incorporated by reference.

INTRODUCTION

The disclosure generally relates to a device for hanging captured game.

When a person hunts, a hunted animal or game may be taken. Such captured game may be cleaned in order for the meat of the animal to be harvested. A device to hang the captured game in a vertical orientation, for example, attaching the device and the captured game to a tree trunk or a post, may be useful to field dress the animal. Additionally, a cutting board may be useful to further portion the meat, for example, to make it easier to transport or put into a transportable refrigeration device such as an ice cooler.

When a person fishes, similarly, a caught fish may be taken. Such captured game may be cleaned in order to display the animal for a picture, remove a hook from the animal, or for the flesh of the animal to be harvested. Such a device to hang the fish in a vertical orientation may be useful to field dress the fish. Additionally, a cutting board may be useful to filet or otherwise portion the fish.

SUMMARY

A device for hanging captured game is provided. The device includes a polymerized device body. The device body includes a front planar surface and a rear planar surface, wherein the rear planar surface is parallel to the front planar surface. The device body further includes a rimless boundary around a perimeter of the polymerized device body and a game hook formed unitarily with the polymerized device body such that a first surface of the game hook is coincident to the front planar surface and a second surface of the game hook is coincident to the rear planar surface. The front planar surface directly transitions to the rimless boundary. The rear planar surface directly transitions to the rimless boundary.

In some embodiments, the game hook includes a first game hook, the polymerized device body includes a second game hook, and wherein the first game hook and the second game hook are disposed at distal sides of the polymerized device body.

In some embodiments, the first game hook and the second game hook each point in a same direction.

In some embodiments, the first game hook points in a first direction. The second game hook points in a second direction opposite to the first direction.

In some embodiments, the device body includes a plurality of game hooks.

In some embodiments, the device body includes at least one through feature forming a handle.

In some embodiments, the device body includes at least one tie-up through feature.

In some embodiments, the device body includes at least one hand guard.

In some embodiments, the polymerized device body is constructed with high-density polyethylene.

In some embodiments, the device body includes fish scaling features formed upon one of the front planar surface or the rear planar surface.

According to one alternative embodiment, a device for hanging captured game is provided. The device includes a device body constructed with a sheet of polymerized material. The device body includes a front planar surface and a rear planar surface, wherein the rear planar surface is parallel to the front planar surface. The device body further includes a rimless boundary around a perimeter of the polymerized device body and a game hook formed unitarily with the polymerized device body such that a first surface of the game hook is coincident to the front planar surface and a second surface of the game hook is coincident to the rear planar surface. The front planar surface directly transitions to the rimless boundary. The rear planar surface directly transitions to the rimless boundary.

In some embodiments, the sheet of polymerized material is constructed with high-density polyethylene.

In some embodiments, the game hook includes a first game hook, and the device body further includes a second game hook.

According to one alternative embodiment, a method for creating a device for hanging captured game is provided. The method includes procuring a sheet of polymerized material, the sheet including a front planar surface and a rear planar surface, wherein the front planar surface is parallel to the rear planar surface. The method further includes cutting the sheet of polymerized material to create a device body including a rimless boundary around a perimeter of the polymerized device body and a game hook formed unitarily with the polymerized device body such that a first surface of the game hook is coincident to the front planar surface and a second surface of the game hook is coincident to the rear planar surface. The front planar surface directly transitions to the rimless boundary. The rear planar surface directly transitions to the rimless boundary.

In some embodiments, the method further includes rounding or cutting away sharp corners around the rimless boundary.

In some embodiments, the method further includes cutting a slot-shaped handle in the polymerized device body.

In some embodiments, the method further includes cutting a handle including arcuate finger holds in the polymerized device body.

In some embodiments, the method further includes drilling a hole in the polymerized device body operable as a tie-up through feature.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIGS. 1-7 schematically illustrate a first embodiment of a device for hanging up captured game, in accordance with the present disclosure;

FIGS. 8-14 schematically illustrate a second embodiment of a device for hanging up captured game, in accordance with the present disclosure;

DETAILED DESCRIPTION

A device useful to hang a captured game animal is provided. The device may include a body portion including a front planar face and a rear planar face, wherein the rear planar face is parallel to the front planar face. The device may further include a handle portion or an attachment portion of the body portion. The device may further include at least one game hook extending from the body portion, wherein the game hook includes a front game hook face which is coplanar with the front planar face of the body portion and a rear game hook face which is coplanar with the rear planar face of the body portion. The device may be used to hang the game animal for a purpose of cleaning the game animal/harvesting meat from the game animal. The device may alternatively be used to hang a hide of the animal in preparation for scraping, curing, and/or tanning the hide.

Skilled anglers adept at the art of catch and release are particularly sensitive to using any fishing aid that could harm the animal; likewise, anglers and huntsmen are sensitive to any equipment that is potentially unsafe or unfit creating the propensity to bruise or soil meat they elect to harvest for human consumption.

A game hanging device may be made of different materials. Metal may be utilized to create a game hanging device. Welds and fastened joints occasionally break. A welding process itself may have an adverse effect on the strength or structural integrity of the members as a result of high welding heat. The use of mechanical fasteners in the fabrication of a hanger also creates joints and/or overlapping metal components which inherently are not entirely rigid and as a result may move, loosen, and weaken or create opportunity for inadvertent and unintended disassembly of the apparatus over time. Joints, creases, and cavities created by imperfect welds may additionally accrue debris, animal hair or fish scales, and may generally lead to an unsanitary condition in an environment where an animal is being cleaned in preparation for harvesting the animal. Further, metal parts may corrode. Further, large, relatively heavy metal parts with game hooks formed upon them may be a hazard around a tossing boat deck or stashed carelessly upon a high garage shelf.

Wood may be utilized to create a game hanging device. Wood may include splinters which may dislodge and become caught within the captured game. Splinters may additionally poke or cut the user, which may be unsanitary in the presence of the game. Wood is porous, and blood or other materials from the game animal may soak into the wood, leading to odors and other unsanitary conditions.

Injection molded plastics or polymers may be utilized to create a game hanging device. Injection molded plastics may be created by injecting molten plastic into a cavity within a tool. Injection molded plastics may include parts with a common or uniform wall thickness to avoid hot spots or warpage that occur when an overly thick wall portion is created. Injection molded plastics may include parting lines where the two or more portions of the tool separate to eject the part from the cavity. Injection molded parts with relatively thin walls with uniform thickness may be relatively low strength, for example, with difficulty in holding up a 150-pound whitetail buck. Parting lines in the plastic may form sharp edges which, when being used to hold up a large, heavy captured game animal, may dig into the hand of the user and cause injury and sanitary issues.

Consequently, despite variability in game hanging device apparatuses disclosed in the prior art and available on the market today, all are plagued with the same problems and deficits in construction, operation and use outlined above. It would therefore be most beneficial to have a game hanging device, specifically a hanger where the main support apparatus is of uncomplicated construction; does not require welded fabrication or the use of fasteners; and yet is both robust and light weight. Additionally, the main support apparatus should be readily adaptable for the utilization in both portable and stationary applications with various apertures for provisioning tertiary and/or tangentially relevant components (i.e. ropes and/or pulley systems) to that of the main support apparatus itself.

It would furthermore be ideal to have a game hanging device smooth enough to not only comport with constant and continued grasping, gripping, and mobilizing of the main support apparatus, but also capable of gingerly handling catch and release animals, specifically fish, with care and without worry of injury from using prior art that is coarse, unrefined, and is oftentimes defined as rough jagged equipment. Rusty metallic surfaces, injection molded parting lines including razor sharp edges, and splinter prone wooden surfaces all pose serious risks when a user is lifting a heavy game animal, for example, a 30 pound salmon or a 100 pound whitetail deer. Similarly, it would be advantageous to have a main support apparatus capable of handling an animal, specifically fish, without coming into direct contact with it against bare skin and risking contracting any number of infectious pathogens including, but not limited to, 'Mycobacterium Marinum' disease, for which specifically there is no currently known vaccine or cure.

It would also be desirable to have a game hanging device including a main support apparatus which presents a simplistic, sanitary cleansing option and reduces or virtually eliminates microbial growth on its surface and by definition, in close proximity to meat to be butchered for human consumption. Finally a main support apparatus which would virtually eliminate the possibility of not only structural defects, but also the propensity for paint flaking, avoids oxidation, in the form of corrosion and/or rust in terms of metal inclusions or rot in terms of wood inclusions as described above in the prior art would be of the utmost prudence.

Sheets of plastic may be utilized to make robust, rigid surfaces. A sheet of plastic may be created with a top planar surface and a bottom planar surface parallel to the top planar surface. In one example, a sheet of high-density polyethylene (HDPE) may be utilized to make a cutting board, for example, including a rectangular shape. The cutting board may be milled or otherwise cut to a desired size and shape. Cut edges of a plastic sheet may be flat, rounded, or radiused and may be created as a smooth surface without sharp features such as a parting line formed by injection molded plastics.

The disclosed device may include a body portion constructed with a sheet of plastic, which may include HDPE or other material, including a front planar face and a rear planar face, wherein the rear planar face is parallel to the front planar face. The device may further include edges of the front planar face and edges of the rear planar face joined by a convex transition boundary. In the alternative, the device may further include edges of the front planar face and edges of the rear planar face joined by a flat side edge boundary. The device may further include at least one suspension aperture or opening operable as a handle or attachment portion of the body portion. The device may further include at least one tapered game hook extending from the body portion at a first location and coplanar with the front planar face of the body portion. The device may further include a second tapered game hook extending from the body portion at a second location distal from the first location and may be coplanar with the front planar face of the body portion. The flat planar surfaces, being of one piece construction and avoiding any cracks, crevices, or joints, includes excellent sanitary properties, for example, with a simple application of soap and then a rinsing agent, resulting in a clean and sanitary device.

Referring now to the drawings, wherein the showings are for the purpose of illustrating certain exemplary embodiments and not for the purpose of limiting the same, FIGS. 1-7 schematically illustrate a first embodiment of a device 10 for hanging up captured game. The device 10 includes device body 11, a front planar surface 12, a rear planar surface 14, a first game hook 20 formed on a first portion 22 of the device 10, and a second game hook 30 formed on a second portion 32 of the device 10. The first game hook 20 and the corresponding first portion 22 are distal from the second game hook 30 and the corresponding second portion 32 upon the device 10, such that hooks may be utilized to hang a portion of a game animal across the device 10, for example, with two rear legs of a whitetail deer being mounted to the first game hook 20 and the second game hook 30, respectively. Such an attachment spanning the device 10 enables easy cleaning of the game animal attached to the device 10. Device body 11 may be constructed with a sheet of polymerized material. The polymerized material may include HDPE, acrylonitrile butadiene styrene (ABS), polypropylene, or other similar plastic materials.

The first game hook 20 and the second game hook 30 may be used to protrude through a part of the game animal. In one instance, a cut may be made in a leg of the game animal such that a hole in the hide may be fitted over one of the first game hook 20 and the second game hook 30. In another embodiment, a gill slit under a mouth of a fish may be fitted over one of the first game hook 20 and the second game hook 30. The first game hook 20 and the second game hook 30 are formed unitarily with the device body 11, such that surfaces of the first game hook 20 and the second game hook 30 are coincident to the front planar surface 12 and the rear planar surface 14. The first game hook 20 and the second game hook 30 both point in a same direction, such that if the device 10 is oriented with the first game hook 20 and the second game hook 30 in an upward direction, gravity may retain the game animal to both the first game hook 20 and the second game hook 30.

A number of attachment through features and handle through features may be formed in the device 10. A first handle 40, a second handle 41, and a third handle 42 are illustrated cut or otherwise formed in the device 10. Throughout the disclosure, a through feature may be described as a ring or band of material in the device body 11 causing a hole or aperture to be formed through the device body 11. The first handle 40, the second handle 41, and the third handle 42 may be slot shapes, oval shapes, rectangular shapes, rounded-rectangular shapes, or other similar shapes. The first handle 40, the second handle 41, and the third handle 42 of FIGS. 1-7 include a slot-shaped handle. Additionally, tie-up through features 50 are illustrated, providing a location for attaching a rope to affix the device 10 to a tree, a post, or other similar structure. Additionally, through features 60 are provided which may be useful for tying portions of the game animal to the device 10. The first handle 40, the second handle 41, the third handle 42, the tie-up through features 50, and the through features 60 are exemplary, a number of different through feature patterns are envisioned, and the disclosure is not intended to be limited to the examples provided.

The device 10 includes a boundary 16 around a perimeter of the device 10. The boundary 16 may be smooth or rounded such that a user may lift the device 10 and an attached game animal without a sharp edge or parting line potentially harming a hand of the user. The boundary 16 may be rimless or lacking a raised rim above the flat planar surfaces, with the flat planar surfaces of the device body 11 transitioning directly to the boundary 16.

The front planar surface 12 and the rear planar surface 14 are flat surfaces which may be useful for processing the game animal. For example, either the front planar surface 12 or the rear planar surface 14 may be used as a cutting board, providing a stable surface upon which a portion of the game animal may rest while a user cuts through the game animal.

Figure 1:
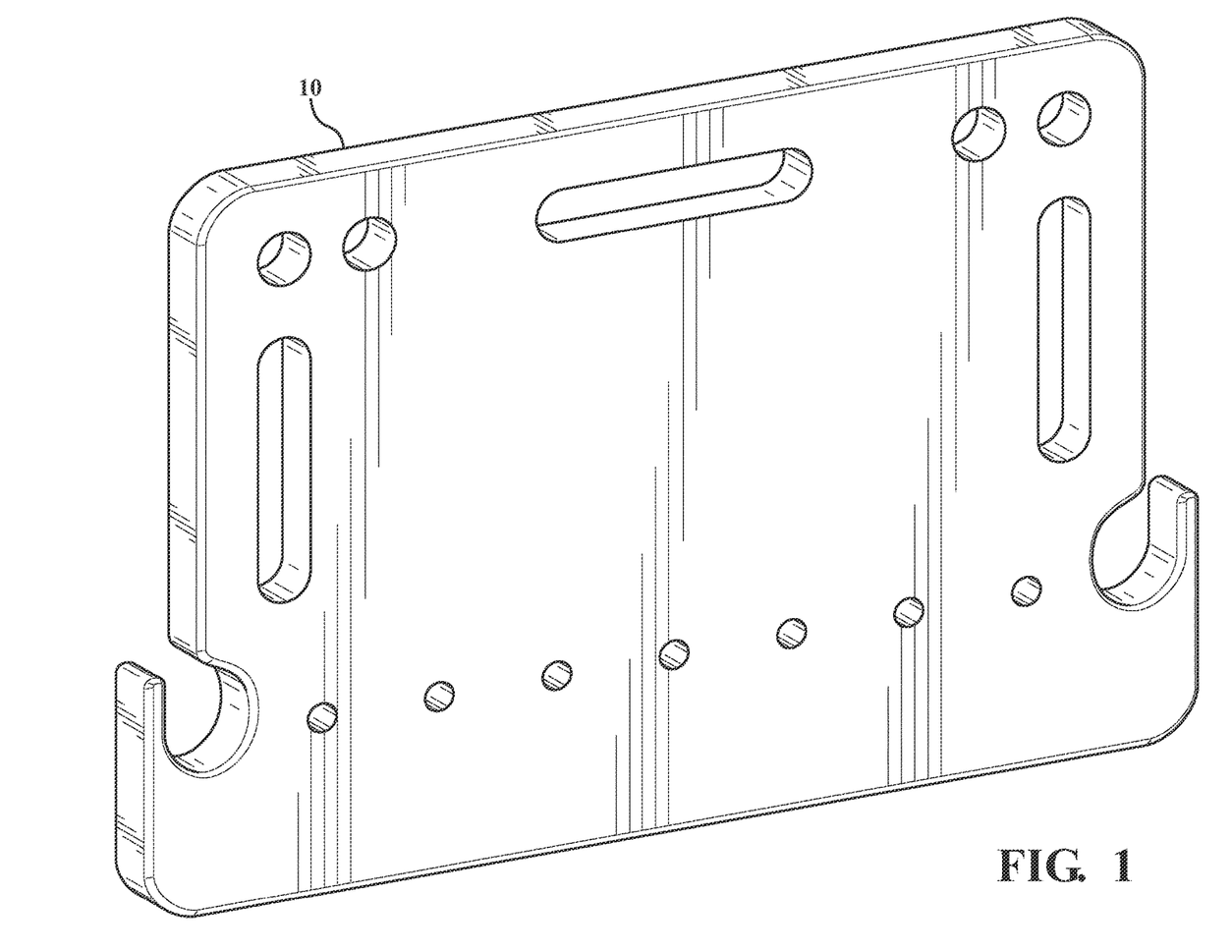
FIG. 1 illustrates the first embodiment in perspective view.
Figure 2:
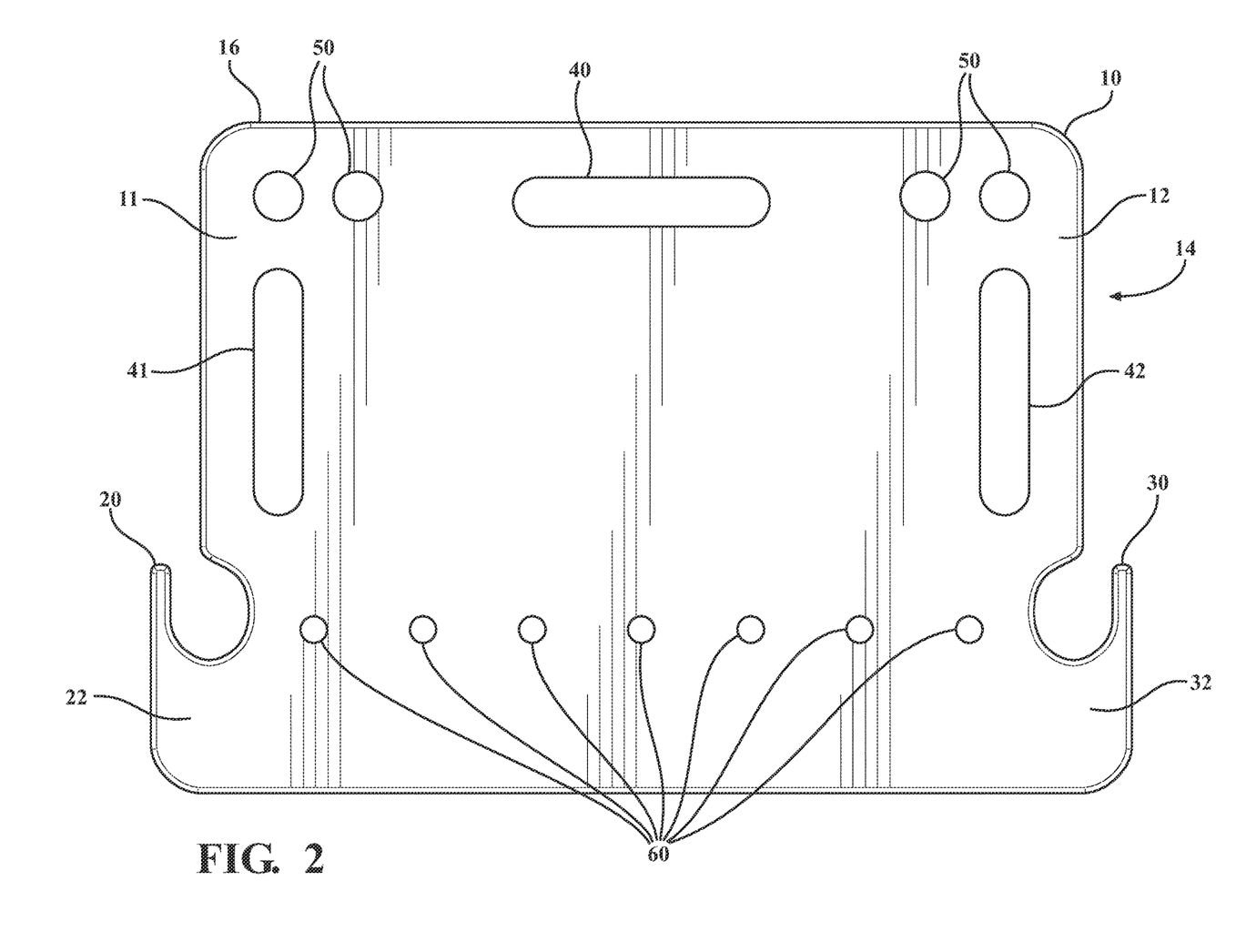
FIG. 2 illustrates the first embodiment in front view.
Figure 3:
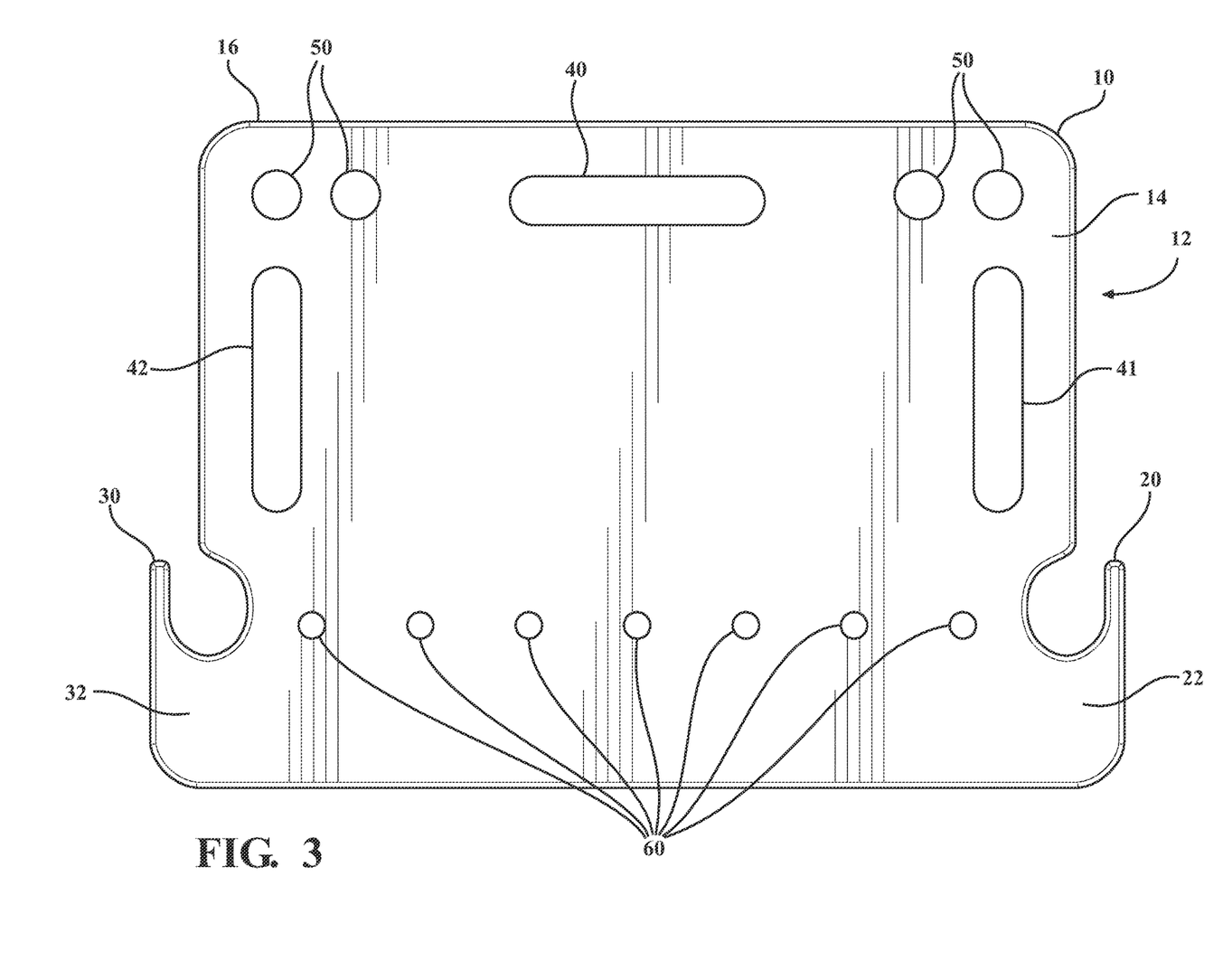
FIG. 3 illustrates the first embodiment in rear view.
Figure 4:
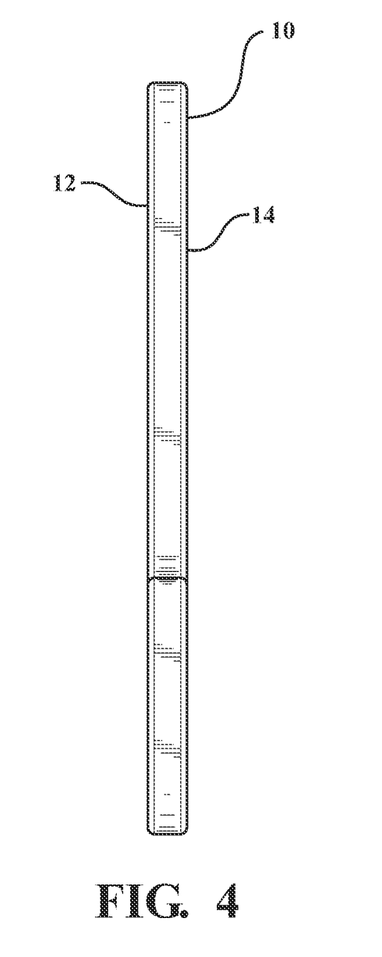
FIG. 4 illustrates the first embodiment in right side view.
Figure 5:
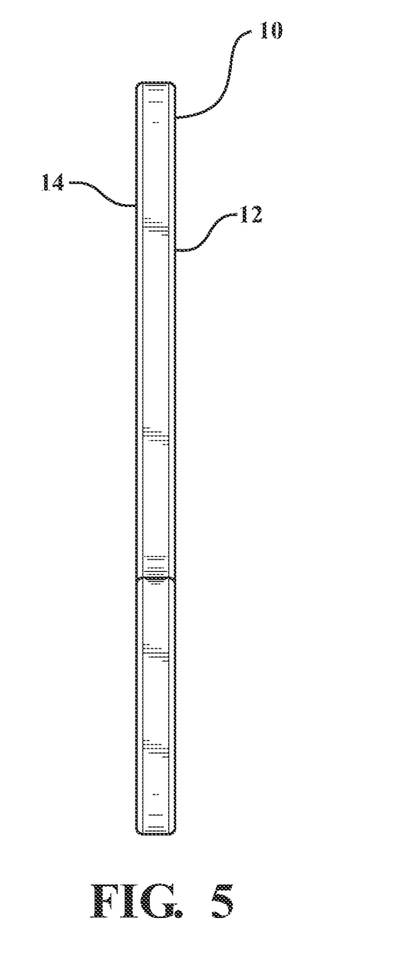
FIG. 5 illustrates the first embodiment in left side view.
Figure 6:
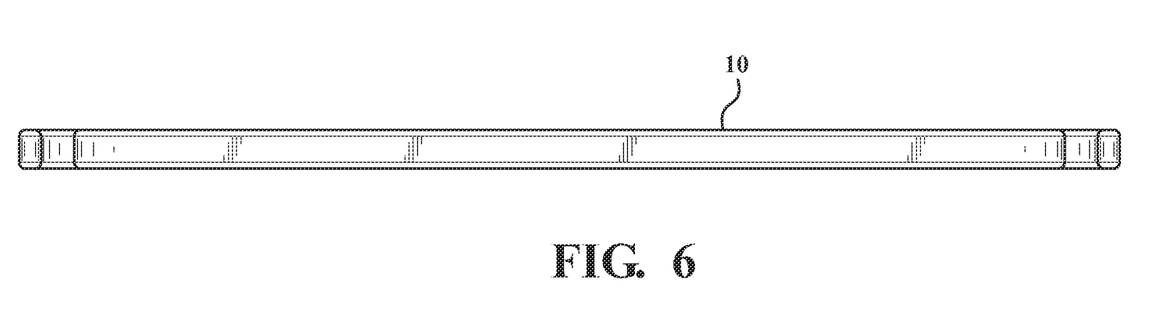
FIG. 6 illustrates the first embodiment in top view.
Figure 7:
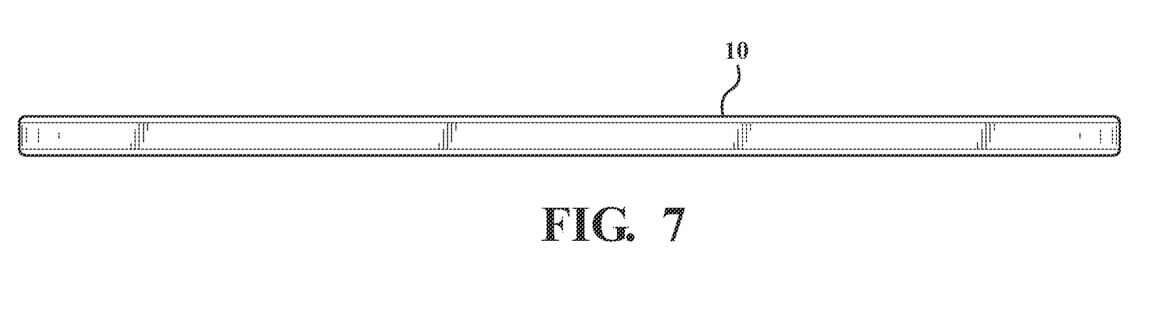
FIG. 7 illustrates the first embodiment in bottom view.

FIG. 1 illustrates the device 10 in perspective view. FIG. 2 illustrates the device 10 in front view. FIG. 3 illustrates the device 10 in rear view. FIG. 4 illustrates the device 10 in right side view. FIG. 5 illustrates the device 10 in left side view. FIG. 6 illustrates the device 10 in top view. FIG. 7 illustrates the device 10 in bottom view.

FIGS. 8-14 schematically illustrate a second embodiment of a device 100 for hanging up captured game. The device 100 includes a device body 111, a front planar surface 112, a rear planar surface 114, a first game hook 120 formed on a first portion of the device 100, and a second game hook 130 formed on a second portion of the device 100. The first game hook 120 and the corresponding portion are distal from the second game hook 130 and the corresponding portion upon the device 100, such that hooks may be utilized to hang a portion of a game animal across the device 100, for example, with two rear legs of a rabbit being mounted to the first game hook 120 and the second game hook 130, respectively. Such an attachment spanning the device 100 enables easy cleaning of the game animal attached to the device 100.

The first game hook 120 and the second game hook 130 may be used to protrude through a part of the game animal. In one instance, a cut may be made in a leg of the game animal such that a hole in the hide may be fitted over one of the first game hook 120 and the second game hook 130. In another embodiment, a gill slit under a mouth of a fish may be fitted over one of the first game hook 120 and the second game hook 130. The first game hook 120 and the second game hook 130 are formed unitarily with the device body 111, such that surfaces of the first game hook 120 and the second game hook 130 are coincident to the front planar surface 112 and the rear planar surface 114. The first game hook 120 and the second game hook 130 point in opposite directions. If the first game hook 120 is oriented in an upward direction, then gravity may be utilized to retain the game animal to the first game hook 120. If the first game hook 120 and the second game hook 130 are oriented horizontally, natural tension in the body of the game animal pulling the body inwardly may be utilized to retain the game animal to the first game hook 120 and the second game hook 130.

A number of attachment through features and handle through features may be formed in the device 100. A handle 140 is illustrated cut or otherwise formed in the device 100. The handle 140 may be oval shapes, rectangular shapes, rounded-rectangular shapes, or other similar shapes. The handle 140 of FIGS. 8-14 include arcuate finger holds. Additionally, hand guard 122 and hand guard 132 are illustrated to either side of the handle 140. The hand guard 122 and the hand guard 132 are useful to protect the hands of the user, for example, from being poked by a still alive fish mounted upon the device 100. Additionally or alternatively, the hand guard 122 and the hand guard 132 may provide locations to which a rope or other affixing mechanism may be used to attach the device 100 to a tree, a post, or a similar structure.

The device 100 includes a boundary 116 around a perimeter of the device 100. The boundary 116 may be smooth or rounded such that a user may lift the device 100 and an attached game animal without a sharp edge or parting line potentially harming a hand of the user.

The front planar surface 112 and the rear planar surface 114 are flat surfaces which may be useful for processing the game animal. For example, either the front planar surface 112 or the rear planar surface 114 may be used as a cutting board, providing a stable surface upon which a portion of the game animal may rest while a user cuts through the game animal.

Figure 8:
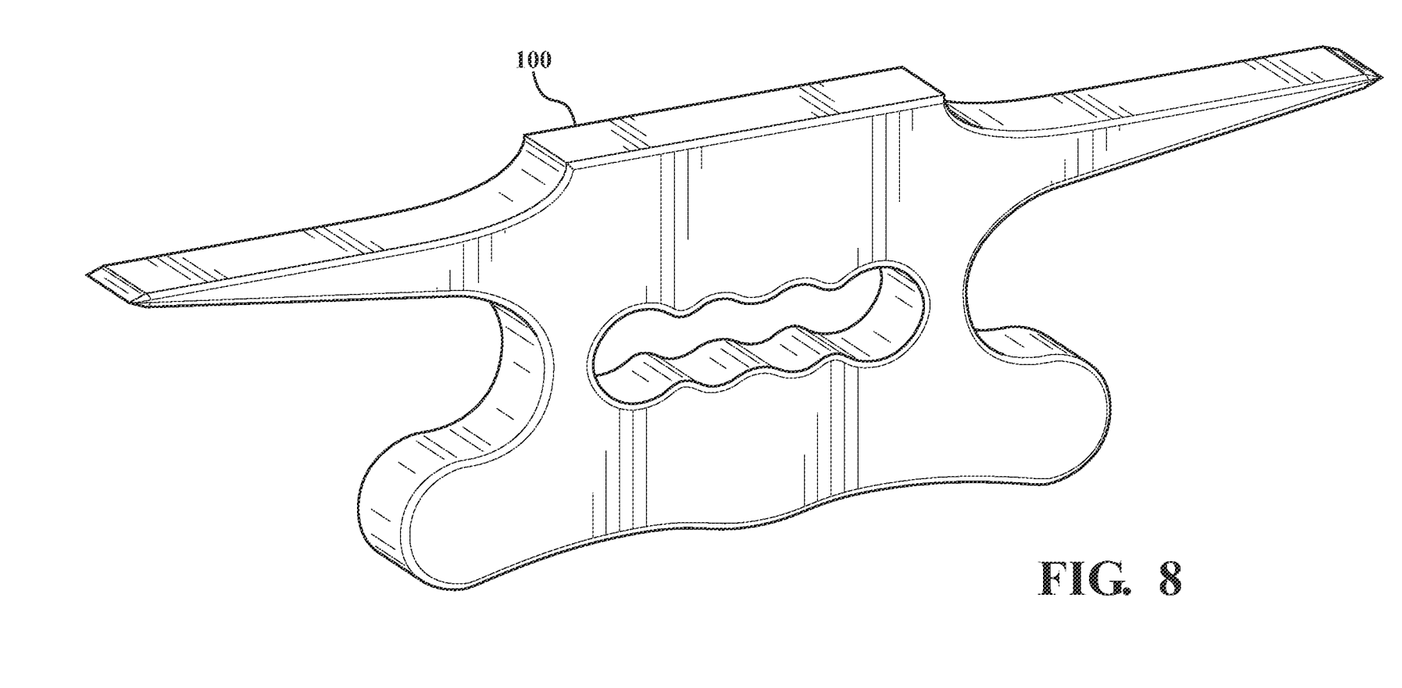
FIG. 8 illustrates the second embodiment in perspective view.
Figure 9:
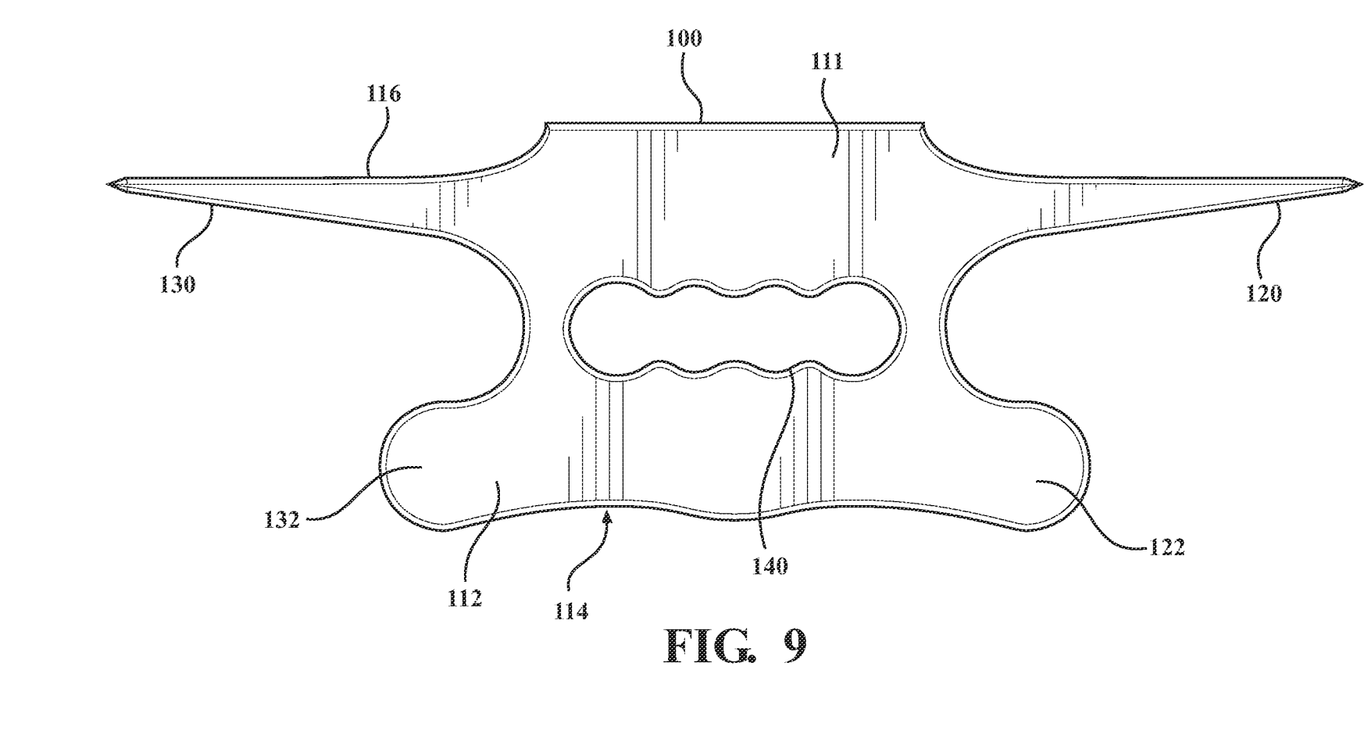
FIG. 9 illustrates the second embodiment in front view.
Figure 10:
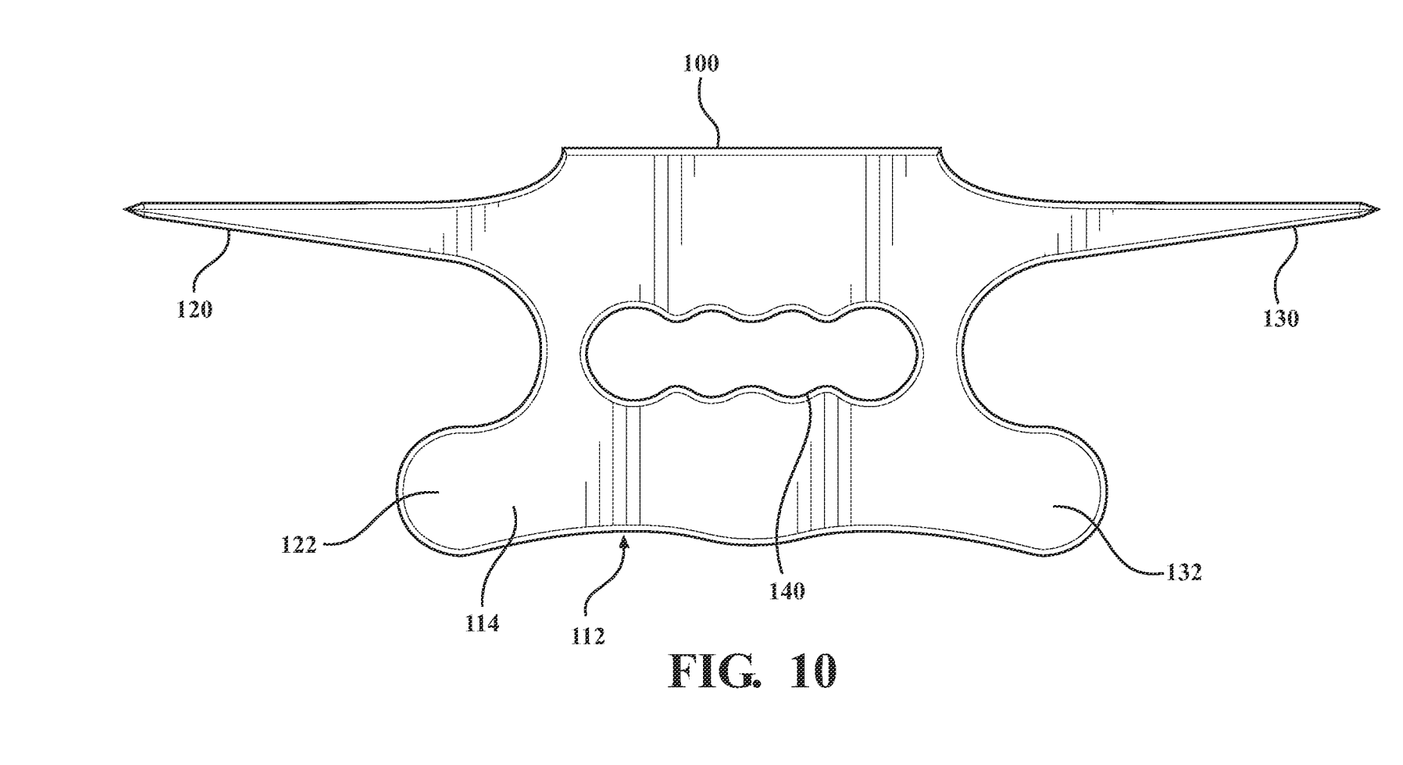
FIG. 10 illustrates the second embodiment in rear view.
Figure 11:
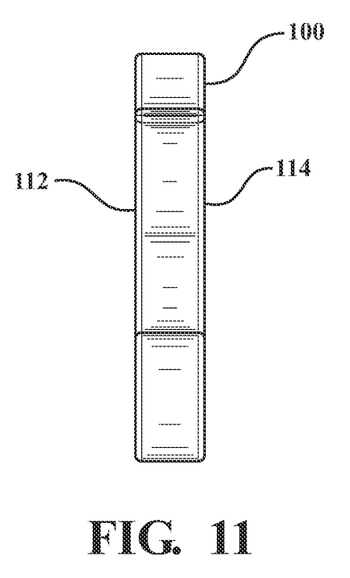
FIG. 11 illustrates the second embodiment in right side view.
Figure 12:
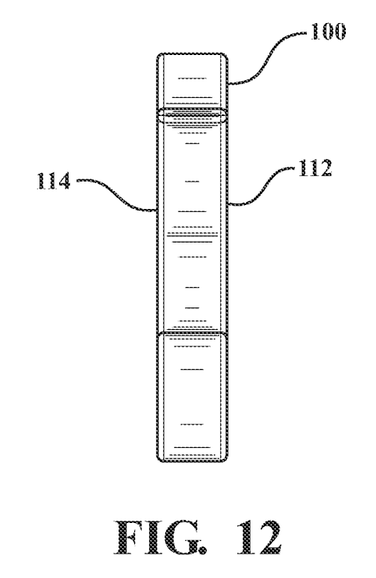
FIG. 12 illustrates the second embodiment in left side view.
Figure 13:
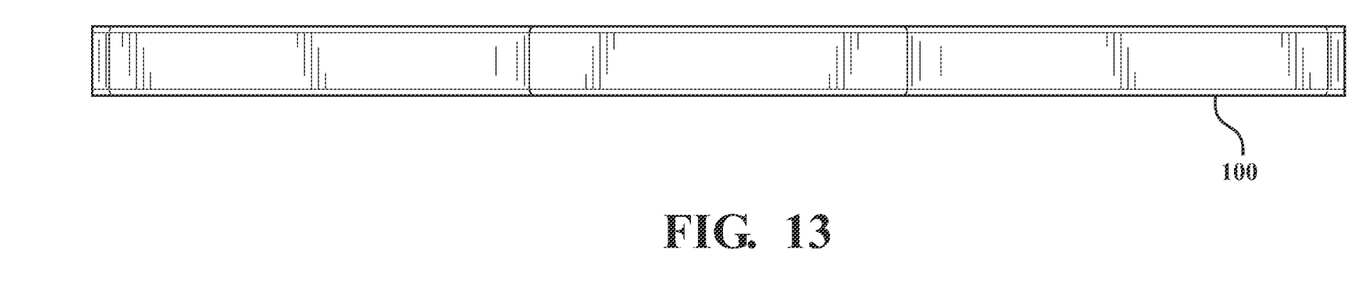
FIG. 13 illustrates the second embodiment in top view.
Figure 14:
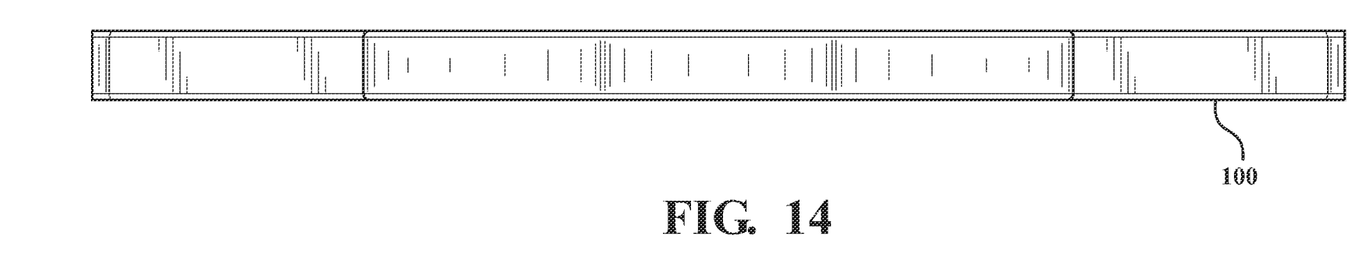
FIG. 14 illustrates the second embodiment in bottom view.

FIG. 8 illustrates the device 100 in perspective view. FIG. 9 illustrates the device 100 in front view. FIG. 10 illustrates the device 100 in rear view. FIG. 11 illustrates the device 100 in right side view. FIG. 12 illustrates the device 100 in left side view. FIG. 13 illustrates the device 100 in top view. FIG. 14 illustrates the device 100 in bottom view.

Figure 15:
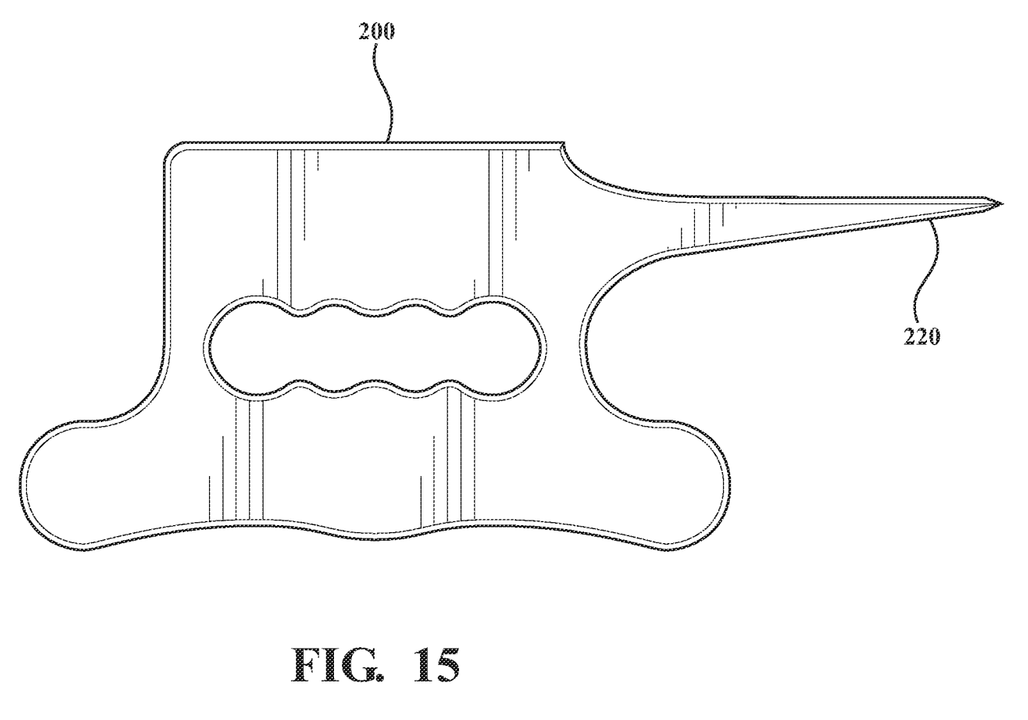
FIG. 15 schematically illustrates a third embodiment of a device for hanging up captured game, in accordance with the present disclosure.

FIG. 15 illustrates a device 200 as an alternative embodiment of device 100 of FIG. 9, with a single game hook 220 provided.

Figure 16:
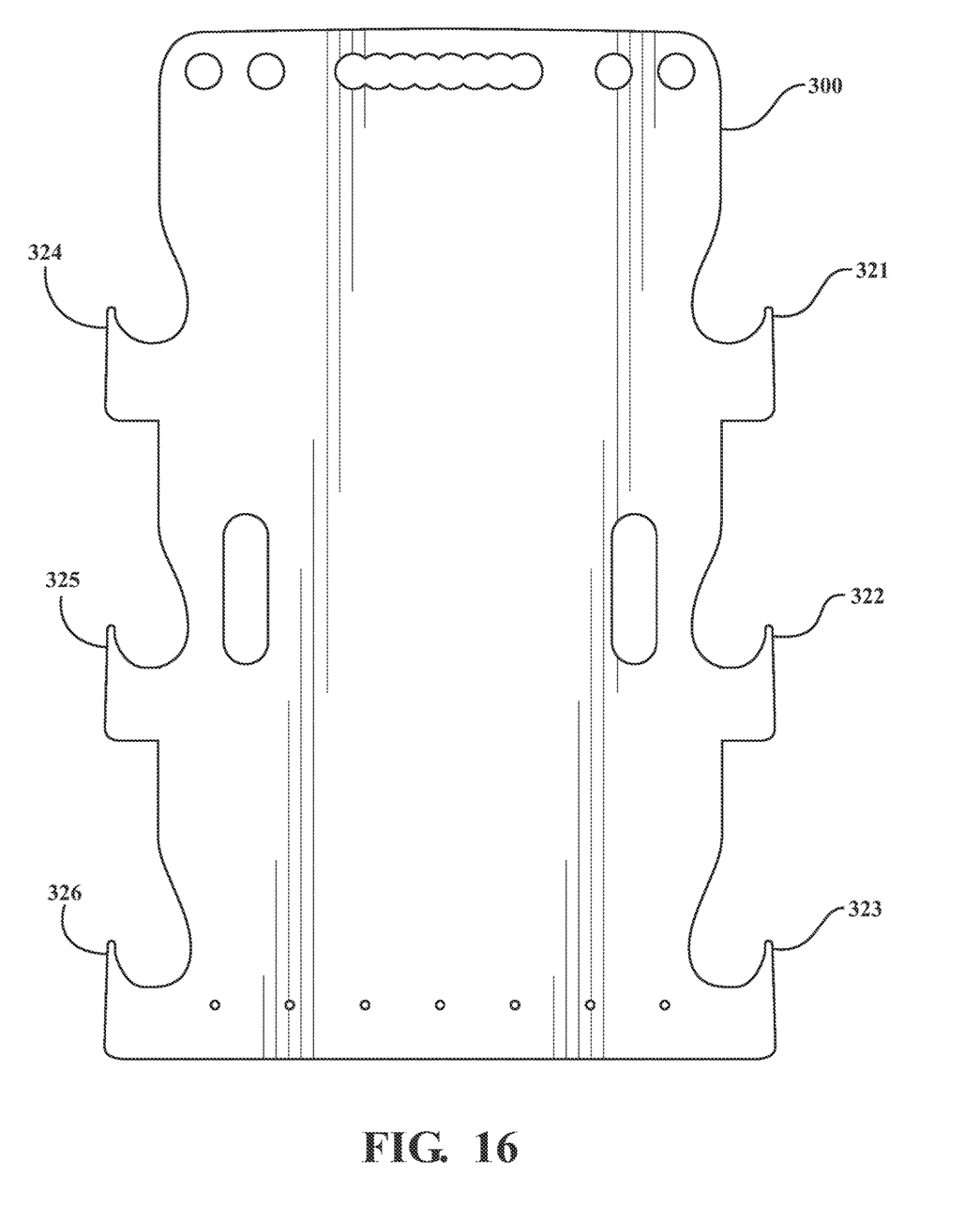
FIG. 16 schematically illustrates a third embodiment of a device for hanging up captured game, in accordance with the present disclosure.

FIG. 16 illustrates a device 300 as an alternative embodiment of device 10 of FIG. 2, with six exemplary game hooks 321, 322, 323, 324, 325, and 326 provided.

Figure 17:
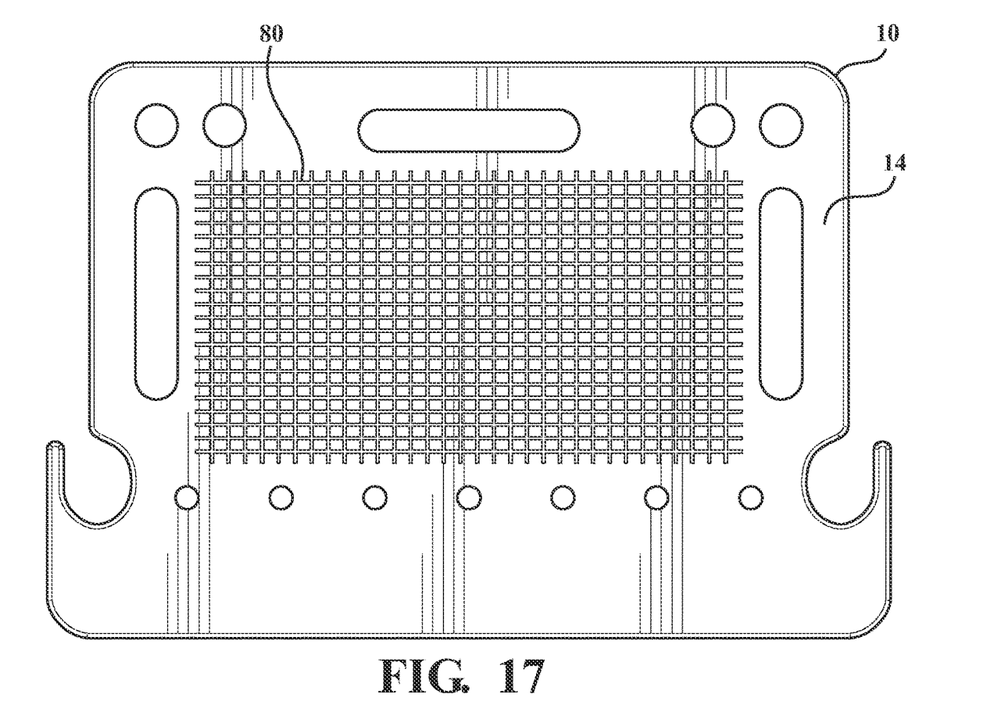
FIG. 17 schematically illustrates a game hanging device with optional fish scaling features provided upon one of the planar surfaces, in accordance with the present disclosure.

FIG. 17 illustrates device 10 as illustrated in FIG. 3, with optional fish scaling features 80 provided upon one of the planar surfaces, in this example, upon the rear planar surface 14. The fish scaling features 80 include a cross-hatch pattern of grooves or material cut away from the rear planar surface 14. The fish scaling features 80 provide a rough surface, such that when a fish is rubbed across the surface, scales of the fish are removed in preparation for or as part of cleaning the fish.

Figure 18:
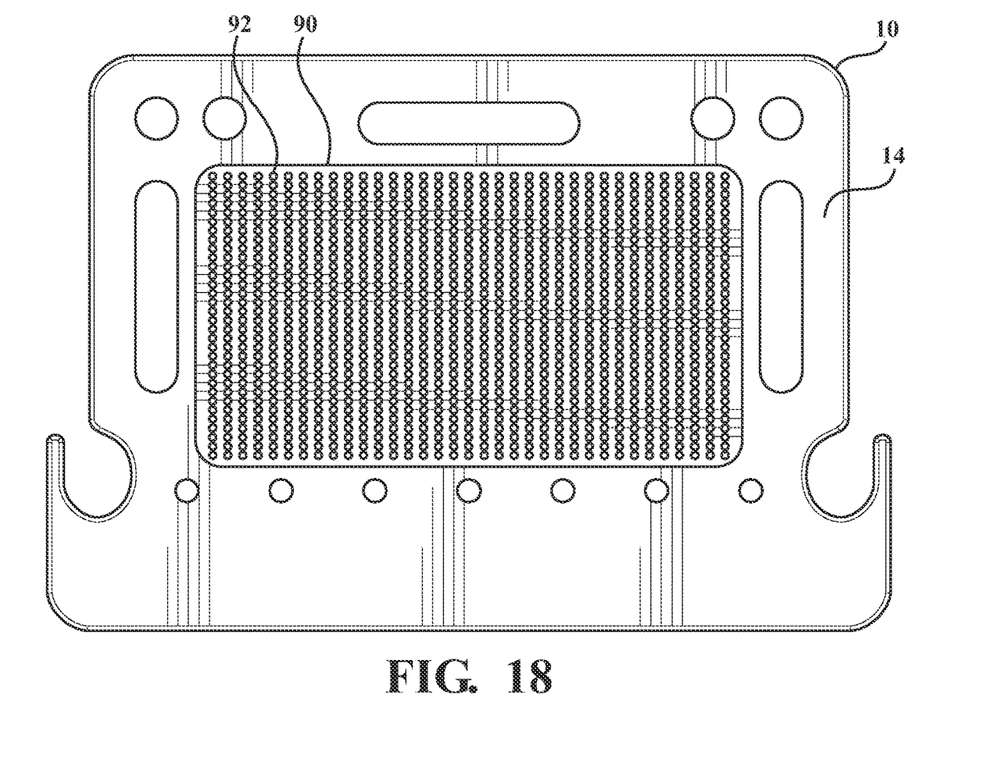
FIG. 18 schematically illustrates a game hanging device with alternative optional fish scaling features provided upon one of the planar surfaces, in accordance with the present disclosure.

FIG. 18 illustrates device 10 as illustrated in FIG. 3, with alternative fish scaling features 90 provided upon the rear planar surface 14. The fish scaling features 90 include a recessed surface formed in the rear planar surface 14, with individual cylindrical posts 92 projecting upward from recessed surface. The cylindrical posts 92 may include a flat top surface that is flush with or coplanar with the rear planar surface 14. The fish scaling features 90 provide a rough surface, such that when a fish is rubbed across the surface, scales of the fish are removed in preparation for cleaning the fish. The fish scaling features 90 may be provided by cutting material away from the rear planar surface 14, may be formed by scoring the rear planar surface 14 with a hot tool, or may be otherwise formed upon rear planar surface 14 with methods in the art.

The disclosed device may be described as device for hanging captured game including a polymerized device body. The body may be described as including a front planar surface, a rear planar surface, a rimless boundary around a perimeter of the polymerized device body, and a game hook formed unitarily with the polymerized device body such that a first surface of the game hook is coincident to the front planar surface and a second surface of the game hook is coincident to the rear planar surface. The rear planar surface is parallel to the front planar surface. The front planar surface may directly transition to the rimless boundary. The rear planar surface may directly transition to the rimless boundary. Alternatively, a method to manufacture the same device may be described or, alternatively, the same device may similarly be described according to the process by which it is created. The method or a product created by a process may be described by creating the device body by acquiring a flat piece of plastic, milling or otherwise cutting a boundary shape of the device to include the game hooks, drilling or otherwise cutting handles and mounting holes in the device body, and rounding and/or smoothing the boundary around the outside of the device to remove any sharp corners.

The disclosed device may be useful for scraping and/or fleshing hides. Scraping may be described as removing fur or hair from a hide. Fleshing may be described as removing fat and other content from underneath the hide. The hide may be stretched across the disclosed device, and the user may use a knife or other similar object to scrape or flesh the hide.

While the best modes for carrying out the disclosure have been described in detail, those familiar with the art to which this disclosure relates will recognize various alternative designs and embodiments for practicing the disclosure within the scope of the appended claims.

What is claimed is:
1. A device for hanging captured game, comprising:
   a polymerized device body including:
      a front planar surface;
      a rear planar surface, wherein the rear planar surface is parallel to the front planar surface;
      a rimless boundary including rounded transitions around a perimeter of the polymerized device body; and
      a game hook formed unitarily with the polymerized device body such that a first surface of the game hook is coincident to the front planar surface and a second surface of the game hook is coincident to the rear planar surface;
   wherein the front planar surface directly transitions to the rimless boundary; and wherein the rear planar surface directly transitions to the rimless boundary.

2. The device of claim 1, wherein the game hook includes a first game hook;
    wherein the polymerized device body includes a second game hook; and
    wherein the first game hook and the second game hook are disposed at distal sides of the polymerized device body.

3. The device of claim 2, wherein the first game hook and the second game hook each point in a same direction.

4. The device of claim 2, wherein the first game hook points in a first direction; and
    wherein the second game hook points in a second direction opposite to the first direction.

5. The device of claim 1, wherein the polymerized device body includes a plurality of game hooks.

6. The device of claim 1, wherein the polymerized device body includes at least one through feature forming a handle.

7. The device of claim 1, wherein the polymerized device body includes at least one tie-up through feature.

8. The device of claim 1, wherein the polymerized device body includes at least one hand guard.

9. The device of claim 1, wherein the polymerized device body is constructed with high-density polyethylene.

10. The device of claim 1, wherein the polymerized device body includes fish scaling features formed upon one of the front planar surface or the rear planar surface.

11. A device for hanging captured game, comprising:
    a device body constructed with a sheet of polymerized material including:
        a front planar surface;
        a rear planar surface, wherein the rear planar surface is parallel to the front planar surface;
        a rimless boundary including rounded transitions around a perimeter of the device body; and
        a game hook formed unitarily with the device body such that a first surface of the game hook is coincident to the front planar surface and a second surface of the game hook is coincident to the rear planar surface;
    wherein the front planar surface directly transitions to the rimless boundary; and
    wherein the rear planar surface directly transitions to the rimless boundary.

12. The device of claim 11, wherein the sheet of polymerized material is constructed with high-density polyethylene.

13. The device of claim 11, wherein the game hook includes a first game hook; and
    wherein the device body further includes a second game hook.

14. A method for creating a device for hanging captured game, comprising:
    procuring a sheet of polymerized material, the sheet including a front planar surface and a rear planar surface, wherein the front planar surface is parallel to the rear planar surface;
    cutting the sheet of polymerized material to create a device body including:
        a rimless boundary including rounded transitions around a perimeter of the device body; and
        a game hook formed unitarily with the device body such that a first surface of the game hook is coincident to the front planar surface and a second surface of the game hook is coincident to the rear planar surface;
    wherein the front planar surface directly transitions to the rimless boundary; and
    wherein the rear planar surface directly transitions to the rimless boundary.

15. The method of claim 14, further comprising rounding sharp corners around the rimless boundary.

16. The method of claim 14, further comprising cutting a slot-shaped handle in the device body.

17. The method of claim 14, further comprising cutting a handle including arcuate finger holds in the device body.

18. The method of claim 14, further comprising drilling a hole in the device body operable as a tie-up through feature.

* * * * *